United States Patent [19]

Tward

[11] 4,433,580
[45] Feb. 28, 1984

[54] PRESSURE TRANSDUCER

[75] Inventor: Emanuel Tward, Northridge, Calif.

[73] Assignee: Tward 2001 Limited, Los Angeles, Calif.

[21] Appl. No.: 400,760

[22] Filed: Jul. 22, 1982

[51] Int. Cl.³ .............................................. G01L 9/12
[52] U.S. Cl. ...................................... 73/718; 361/283
[58] Field of Search ................... 73/718, 724; 361/283

[56] References Cited

U.S. PATENT DOCUMENTS 4,169,389 10/1979 Yasuhara et al. ..................... 73/718

Primary Examiner—Donald O. Woodiel
Attorney, Agent, or Firm—Philip D. Junkins

[57] ABSTRACT

A capacitive type pressure sensing transducer comprised of two dielectric elements bearing four like plates or discs of conducting material and two like conductive pressure sensitive diaphragms which together form two like plate type capacitors of fixed capacitance value and two like plate type capacitors of variable capacitance value. The pressure sensitive diaphragms span like recessed areas in one face of one of the dielectric elements to form two like pressure chambers. The four conducting discs are positioned as matching pairs of capacitive plates on each side of the other dielectric element and together form the two fixed value capacitors. The pressure sensitive diaphragms and one of the conducting disc pairs are aligned to form the two variable value capacitors with their capacitance value depending upon the variable spacing distance of the diaphragms from the aligned discs in response to pressure applied to the diaphragms. The pair of variable value capacitors and pair of fixed value capacitors comprise all of the capacitance elements of a Wheatstone bridge circuit in a single transducer unit in which such capacitive elements are all subjected to the same temperature and pressure environment and are not sensitive to stray capacitances. A source of alternating current is applied across a first set of bridge terminals and a current detection circuit is connected across a second set of bridge terminals and translates current value into a value of pressure applied to the transducer.

12 Claims, 3 Drawing Figures

PRESSURE TRANSDUCER

BACKGROUND OF THE INVENTION

1. Field of the Invention

This invention relates to pressure sensing transducers and more particularly to capacitive type pressure sensing transducers.

2. Description of the Prior Art

Many forms of pressure sensing transducers utilizing capacitive sensors have been disclosed in the prior art. Most variable capacitive sensors have a deformable metallic member such as a diaphragm, bellows or beam which forms one plate of a plate type capacitor and can be moved relative to a base structure by the actuating pressure. An electrode member rigidly connected to, but electrically insulated form, the base and in close proximity to the deformable member forms the other plate of the variable capacitive sensor. Conventional capacitance sensors of this type have several significant disadvantages. Proper alignment of the sensor components is very difficult to achieve. Since reasonable values of capacitance and high relative change of capacitance with plate movement require very small gap dimensions, typically on the order of 0.001 inches, proper control of parallelism and gap dimensions is extremely important. To achieve proper alignment of the capacitor plates, very precise and small tolerances must be placed upon the component parts.

The possibilities for degradation of performance by thermal shift in structural alignment is difficult to avoid with a typical capacitive type transducer having long thermal paths in the structure determining the relative portions and alignment of the capacitance plates. The thermal problems include both the changes induced by different ambient temperatures and the transient effects produced when a temperature change occurs. These problems are further complicated by the fact that structure requirements for particular portions, such as the elastic properties of the diaphragm material, make it difficult to choose materials such that there may be a cancellation of the effects caused by thermal expansion. A further disadvantage of existing structures is that mounting stresses, which frequently occur when the structure is affixed to the system being measured, cause distortions in one or both of the capacitance plate and support structures. Such distortions can cause a shift in the initial value of the capacitive sensor and/or a change in the rate at which capacitance changes with applied force.

Capacitive pressure sensing transducers have also been constructed of ceramic, quartz or other dielectric materials to form chambers or walls with conductive films on their interior surfaces. U.S. Pat. Nos. 3,715,638 and 3,858,097 granted to W. R. Polye are illustrative of such constructions. The operative portions of these prior art constructions are substantially flat and of substantially uniform thickness. With chambers or capsules having walls of uniform thickness there is a stress concentration in the peripheral region where the walls are fused together and the deflection of the conductive surfaces of the transducer varies with the radial position of the deflection portion. In U.S. Pat. No. 4,168,518 granted to S. Y. Lee there is disclosed a capacitive pressure transducer structure in which deflection and maximum stress is controlled by the elastic properties and strength of the dielectric material carrying the capacitive plates rather than by the properties of a fusing or cementing material.

As previously related, prior art capacitive type pressure or force sensing transducers have been found to be sensitive to temperature change. They also have high impedance output and frequently require complex external electronic circuitry. The typical capacitive type transducers utilize a single plate type capacitor system and must be reactively as well as resistively balanced with external capacitive bridge circuitry. Long lead lengths and moving leads allow stray capacitive impedance pickup and thus introduce extraneous impedance variations to the detection, measurement and pressure or force value indication circuitry. It is often necessary to have a preamplifier close to the transducer.

SUMMARY OF THE INVENTION

The present invention relates to a capacitive type pressure sensing transducer comprised of two dielectric elements bearing four like plates or discs of conducting material and two like conductive pressure sensitive diaphragms which together form two like plate type capacitors of fixed capacitance value and two like plate type capacitors of variable capacitance value. The pressure sensitive diaphragms span like recessed areas in one face of one of the dielectric elements and are bonded at their respective peripheral edge to such element to form two like pressure chambers. The four like plates or discs of conducting material are positioned as matching pairs of capacitive plates on each face of the second dielectric element with such element sandwiched to the other face of the first dielectric element with a capacitive plate on each side of the second dielectric element aligned with a diaphragm on the first dielectric element. When pressure is applied to the pressure sensitive diaphragms deformation thereof occurs across recessed areas in the first dielectric element and the spacing between the diaphragms and the aligned conducting plate interfacing with such element on the other side thereof varies in relationship to the applied pressure. Thus, a change in pressure applied to the diaphragms produces a corresponding change in capacitance between the two like plate type capacitors of variable capacitance value formed by the deformable diaphragms and their aligned conductive plates and such change may be sensed by leads connected to such diaphragms and plates. Lead wires from the four like plates or discs positioned as matching pairs of capacitive plates on each face of the second dielectric element are connected with associated circuitry so that such plates form the two like capacitors of fixed capacitance value. The present invention overcomes the deficiencies of prior art capacitive type pressure sensing transducers by uniquely combining these four capacitances into classic Wheaatstone bridge circuitry including an alternating current generator and current flow detection, measurement and value indicating circuitry.

It is an object of the present invention to provide an improved capacitive type pressure transducer of multi-capacitor design that is insensitive in its accuracy of pressure measurement to changes in the environmental characteristics to which it is exposed.

It is another object of the present invention to provide an improved capacitive type pressure transducer of multi-capacitor design which can be readily incorporated in classic Wheatstone bridge circuitry and which is insensitive in its accuracy of measurement to environmental changes or to stray capacitance.

It is a further object of the present invention to provide an improved capacitive pressure transducer including two like plate type capacitors of fixed capacitance value and two like plate type capacitors of variable capacitance value and in which the plates of the variable capacitors remain substantially parallel throughout the operating range of the transducer.

These and other objects of the invention will become apparent to those skilled in the art upon consideration of accompanying specification, claims and drawing.

BRIEF DESCRIPTION OF THE DRAWING

Referring to the drawing, wherein like characters indicate like parts throughout the figures.

DESCRIPTION OF THE PREFERRED EMBODIMENT

The present invention is intended as an improvement on conventional capacitive pressure sensing transducers. The transducer of the invention incorporates a uniquely configured arrangement of four plate type capacitors. The four capacitors are constructed from two like conductive pressure sensitive diaphragms and four like electrically conductive plates or discs mounted on two dielectric elements.

Figure 2:
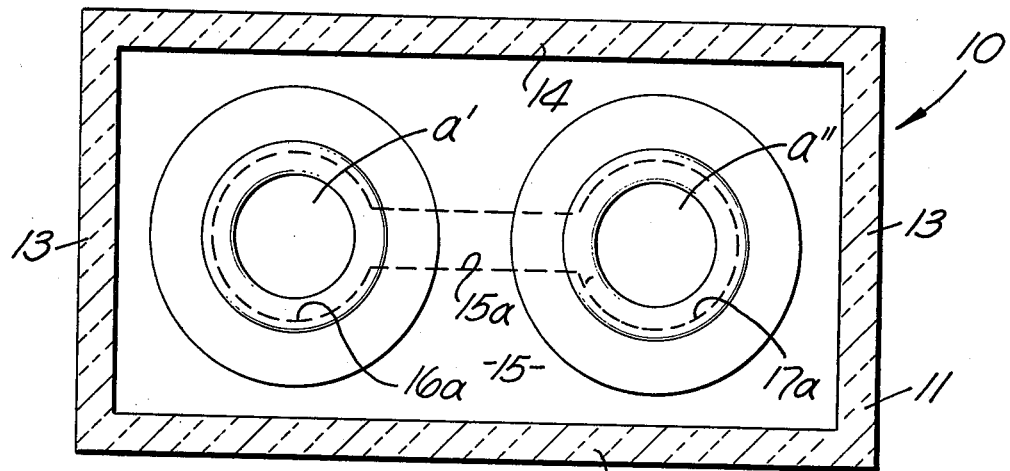
FIG. 2 is a plan view of the transducer of FIG. 1 taken at line 2—2 of FIG. 1.
Figure 1:
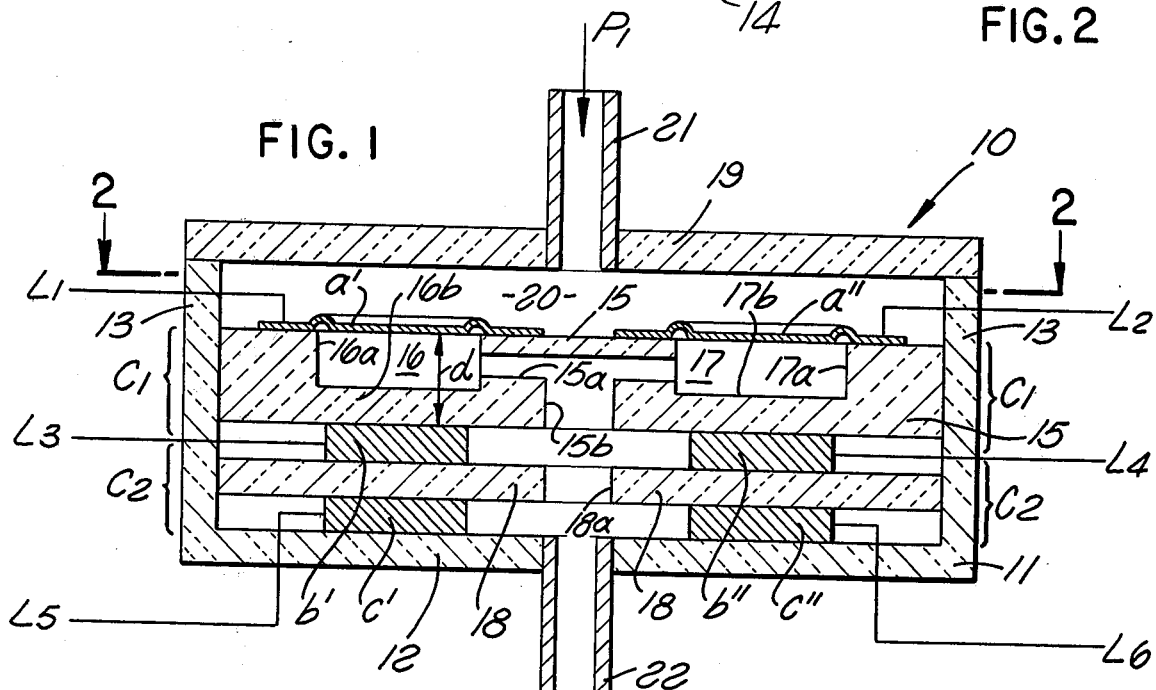
FIG. 1 is an elevation view in cross-section of the capacitive type pressure transducer of the present invention.

Referring now to the drawing, a multi-capacitor pressure sensing transducer 10, in accordance with the invention, is illustrated in longitudinal cross-section in FIG. 1. The transducer components may be mounted in a housing 11 comprised of a bottom wall 12, end walls 13 and side walls 14. The transducer itself is principally comprised of two insulating members or dielectric elements 15 and 18. Dielectric element 15 has two like recessed areas 16 and 17 formed by annular side walls 16a and 17a, respectively, and bottom walls 16b and 17b, respectively. The recessed areas or chambers 16 and 17 are enclosed by like annular conductive pressure sensitive diaphragms a' and a", respectively, and such chambers may be interconnected by a pressure equalizing conduit 15a in dielectric element 15. The like diaphragms a' and a" are sealed, cemented or fused by appropriate means along their peripheral edges to dielectric element 15 in the annular area immediately surrounding recessed areas 16 and 17.

Figure 3:
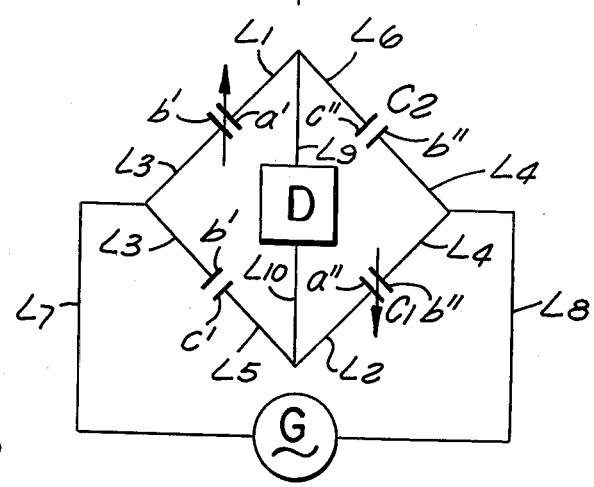
FIG. 3 is a schematic block diagram of circuitry in which the capacitors of the transducer of FIG. 1 are clearly identified in a classic Wheatstone bridge circuit configuration.

Dielectric element 18 has a peripheral configuration similar to the peripheral configuration of element 15 with the peripheral configurations of both such elements conforming to the inner wall configuration of housing 11. Element 18 bears conductive plates or discs b' and b" on one of its planar faces and conductive plates or discs c' and c" on the other of its planar surfaces. Alternatively, these discs may comprise like areas of conductive metallic film applied to the dielectric element by known metal sputtering, thermal deposition or printing techniques. Also, the conductive discs or conducting films b' and b" may be carried by dielectric element 15 on its planar face opposite diaphragms a' and a" rather than by a planar face of dielectric elements 18. Appropriate lead wires L1, L2, L3, L4, L5 and L6 connect the diaphragms a' and a" and discs b', b", c' and c", respectively, together (as shown in FIG. 3) so that such diaphragms and plates form the two variable value capacitors and two fixed value capacitors of a classic Wheatstone bridge circuit.

Transducer housing 11 is provided with a top closure member 19 which is appropriately sealed to the housing walls and forms therewith a closed pressure chamber 20 above diaphragms a' and a". Chamber 20, in turn, may be connected to a variable pressure medium $P_1$ through threaded pressure inlet tube 21 leading from closure member 19. The pressure chambers 16 and 17 within dielectric element 15 (interconnected via conduit 15a) are further connected through conduit 15b and orifice 18a in dielectric element 18 to a threaded pressure inlet tube 22 in bottom wall 12 of housing 11 through which a variable pressure medium $P_2$ may be applied to such chambers and the underside of diaphragms a' and a". Thus, a transducer in accordance with the invention is suitable for sensing differential pressures, i.e., the differential pressure value between applied pressure $P_1$ and applied pressure $P_2$. Alternatively, pressure inlet tube 22 may merely be opened to atmosphere or may be sealed off to create a fixed internal positive pressure or negative pressure within chambers 16 and 17 interfacing with the underside of diaphragms a' and a".

As shown in FIG. 1 the dielectric elements 15 and 18 are sandwiched together in transducer housing 11. Preferrably, these elements are affixed therein as by bolts (not shown) which extend through such elements and housing bottom wall 12 or by appropriate adhesive bonding of the edges of the elements to end walls 13 and side walls 14 whereby the capacitive plates or discs b', b", c' and c" are maintained in fixed position and alignment with diaphragms a' and a" and the dielectric spacing between such discs remains constant. Through the transducer structure as described herein before, the two like variable value capacitors $C_1$ are formed by diaphragm a' and disc b' and by diaphragm a" and disc b". Two like fixed value capacitors $C_2$ are formed by disc b' and disc c' and by disc b" and disc c". As will be appreciated from study of FIGS. 1 and 3 of the drawing, the conductive diaphragms and discs of the transducer are all insulated from each other within the structure of the device and are protected from undesired electrical connection between same by housing 11. The electrically conductive lead wires L1, L2, L3, L4, L5 and L6 leave the transducer 10 via appropriate insulated passage therefrom. When these lead wires are further connected to alternating current generator circuitry "G" by leads L7 and L8 and detection, measurement and value indicating circuitry "D" by leads L9 and L10, as shown in FIG. 3, there results simple bridge circuitry of classic Wheatstone configuration. Because all four capacitors of the bridge circuit are clustered together within the transducer structure 10, the circuitry is not subject to stray capacitance and long leads may be used to connect the pressure sensing device with the current generator circuit G and/or the detector, measurement and value indicating circuitry D.

The pressure sensing transducer of FIG. 1 of this invention is particularly applicable to a pressure measurement situation involving the measurement or monitoring of a single pressure medium. Thus, the application of pressure through inlet tube 21 to diaphragms a' and a" causes such diaphragms to deflect within chambers 16 and 17, respectively, toward capacitive discs b' and b", respectively. The reduction in the spacing between these diaphragms and such discs results in a increase in the capacitance value which variable capacitors $C_1$ display with respect to the bridge circuitry. Since the deflection of each diaphragm takes place almost solely in its outer peripheral region, rather than within its central region, the capacitive plates forming the capacitors $C_1$ (central regions of the diaphragms a' and a" and discs b' and b") remain in substantially planar parallel relationship as the spacing distance "d" varies. Even if the planar capacitive surfaces of diaphragm-disc pairs a'-b' and a"-b" experience some non-parallelism during flexing of the diaphragms under pressure forces $P_1$, the fact that such surfaces are represented by two like capacitors $C_1$ in the electronic Wheatstone bridge circuitry overcomes adverse non-parallellism flexing effects and non-linear variations in capacitance and hysteresis effects are obviated.

Before the application of any pressure $P_1$ to the transducer of this invention the applied alternating current is varied as to its frequency and/or voltage and/or the detector circuitry (including its measuring and/or pressure value indicating instrumentation) is adjusted in known manner to obtain the appropriate sensitivity required for measuring pressure or pressure differential values when applied to the transducer. For the bridge circuit of FIG. 3 the respective capacitors may have impedance values as indicated below:

Fixed value capacitors $C_2$ impedance = $Z_2$

Variable value capacitors $C_1$ impedance = $Z_1$

The detector circuitry D also presents an impedance value which may be designated as $Z_3$. The alternating current generator circuitry, at set frequency, has a constant voltage "e" which is applied across the bridge. Thus, If $Z_3$ is of small value, i.e., $Z_3 < Z_1$ and $Z_2$ then it can be established that the current "i" through the detector circuitry is:

$$i = (e\omega \div 2)(C_1 - C_2)$$

where
e is the voltage value and
$\omega = 2\pi \times$ frequency

The current value i in the detector circuitry changes in linear relation to changes in the capacitance value of capacitors $C_1$. Therefore, changes in the $C_1 - C_2$ relationship may be determined by measuring changes in the current value i. Furthermore, with appropriate detector and a.c. generator circuitry (e.g. by keeping the current i constant and varying the $\omega$ value) the readout of the $C_1 - C_2$ value can be effected by measuring the period of the angular frequency $\omega$. Thus, the readout instrumentation in the detector circuitry may yield digital values of pressure in direct linear relationship to the changes in capacitances $C_1$ (for small changes in $C_1$).

From the foregoing, it will be appreciated that the bridge circuitry, comprised of the two like and substantially fixed value capacitors and the two like variable value capacitors, is arranged to be in an unbalanced state (current flowing through the detection circuit) at all instances when pressure is applied to the transducer diaphragms a' and a" and the dielectric value of chambers 16 and 17 vary from their normal value. With the bridge circuitry structured and operating in this fashion the detector circuitry reads the bridge unbalance (value of current flow) linearly as a direct measurement of capacitance value difference and the detector circuitry with associated measurement and value indicating circuitry will report or display such difference or may be modified by well known circuitry means to report or display the actual (changing) capacitance of chambers 16 and 17 or the actual (changing) pressure value applied.

Typically, for the foregoing embodiment of the invention, the diaphragms a' and a" are fabricated of metal with good elastic and chemical properties such as heat-treatable stainless steel. The dielectric elements 15 and 18 may be made of dielectric material such as ceramic, glass, quartz or plastic. As previously indicated, the capacitive plates or discs b', b", c' and c" are of appropriate conducting material or may be comprised of conductive film material applied to the dielectric elements by sputtering, thermal deposition, photographic or other deposition techniques. It is desirable that the dielectric elements have a thermal coefficient of expansion similar to that of the diaphragms, plates or discs or conductive film material, and the transducer housing. It should also be noted that the pressure sensitive diaphragms may be replaced functionally by bellows type pressure sensitive devices.

While certain preferred embodiments have been described above, it will be apparent to those skilled in the art that modifications may be made for specific applications without departing from the spirit and scope of the novel concept of this invention. Thus, a pressure measuring instrument may be the ultimate form of the invention, or the novel transducer may be part of an operating system wherein the change in capacitance (related to the application of force or pressure) is used to control a parameter which will affect system performance and the pressure being measured. Therefore, it is intended by the appended claims to cover all such modifications and variations which fall within the true spirit and scope of the invention.

What is claimed is:

1. A capacitive type pressure sensing transducer comprising:
   (a) a first transducer body element formed of dielectric material and with two like recesses on a first planar surface thereof;
   (b) a second transducer body element formed of dielectric material and positioned in parallel relationship with said first body element adjacent the second planar face of said first element;
   (c) a first pair of like electrically conductive flat capacitor plates located between said first and second body elements and aligned with the recesses on the first planar face of said first body element;
   (d) a second pair of like electrically conductive flat capacitor plates aligned with said first pair of capacitor plates and spaced therefrom by the second tranducer body element, said first and second pairs of capacitor plates forming two plate type capacitors of like fixed electrical capacitive value; and
   (e) a pair of like electrically conductive pressure sensitive elements spanning the recesses on the first planar face of said first body element and sealed at their respective peripheries to said body element to form two like pressure chambers, said pair of pressure sensitive elements and said first pair of capacitor plates with the intervening pressure chambers and dielectric material of said first body element forming two plate type capacitors of like variable electrical capacitive value, the application of an external pressure force to said pressure sensitive elements causing deflection thereof and a change in the spacing distance between said pressure sensitive elements and said capacitor plates thereby varying the electrical capacitive value of said variable value capacitors in direct relationship to the applied pressure force value.

2. A capacitive type pressure sensing transducer as defined in claim 1 wherein the like electrically conductive pressure sensitive elements are metallic diaphragms.

3. A capacitive type pressure sensing transducer as defined in claim 1 wherein the like electrically conductive pressure sensitive elements are metallic bellows.

4. A capacitive type pressure sensing transducer as defined in claim 1 wherein the pressure chambers formed by the recesses on the first planar face of said first transducer body element and the electrically conductive pressure sensitive elements spanning said recesses are interconnected to equalize the pressure within said chambers.

5. A capacitive type pressure sensing transducer as defined in claim 1 wherein the pressure chambers formed by the recesses on the first planar face of said first transducer body element and the electrically conductive pressure sensitive elements spanning said recesses are connected to a second external pressure force whereby the deflection of said pressure sensitive elements is responsive to the pressure value difference between said first and second applied pressure forces.

6. A capacitive type pressure sensing transducer as defined in claim 1 wherein the pressure chambers formed by the recesses on the first planar face of said first transducer body element and the electrically conductive pressure sensitive elements spanning said recesses are connected to the atmosphere whereby the deflection of said pressure sensitive elements is responsive to the pressure value difference between said applied pressure force and atmosphere pressure.

7. A capacitive type pressure sensing transducer as defined in claim 1 wherein said transducer body elements are fabricated of plastic material.

8. A capacitive type pressure sensing transducer as defined in claim 1 wherein said transducer body elements are fabricated of quartz.

9. A capacitive type pressure sensing transducer as defined in claim 1 wherein said transducer body elements are fabricated of molded glass.

10. A capacitive type pressure sensing transducer as defined in claim 1 wherein said transducer body elements are fabricated of molded ceramic material.

11. A capacitive type pressure sensing transducer as defined in claim 1 wherein means are provided to connect the two capacitors of like fixed electrical capacitive value and the two capacitors of like variable electrical capacitive value together to form the four capacitive sides of a Wheatstone bridge circuit, the pair of fixed value capacitors connected as two opposing sides of said bridge and the pair of variable value capacitors connected as the remaining two opposing sides of said bridge.

12. A capacitive type pressure sensing transducer as defined in claim 11 wherein a source of alternating current of constant voltage and set frequency is applied across said bridge circuit to a first set of bridge terminals at opposite corners of the bridge, each of said first terminals located between a fixed value capacitor and a variable value capacitor, and a detection circuit is connected across said bridge circuit to a second set of terminals independent of said first set of terminals and at opposite corners of the bridge, each of said second terminals located between a fixed value capacitor and a variable value capacitor, said detection circuit including current value measurement and current value indication circuitry.

* * * * *